US009744861B2

(12) United States Patent
Toda et al.

(10) Patent No.: US 9,744,861 B2
(45) Date of Patent: Aug. 29, 2017

(54) POWER CONVERSION DEVICE

(71) Applicant: Hitachi Automotive Systems, Ltd., Hitachinaka-shi, Ibaraki (JP)

(72) Inventors: Issei Toda, Hitachinaka (JP); Koichi Ono, Hitachinaka (JP); Shinichirou Hida, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/026,479

(22) PCT Filed: Sep. 29, 2014

(86) PCT No.: PCT/JP2014/075774
§ 371 (c)(1),
(2) Date: Mar. 31, 2016

(87) PCT Pub. No.: WO2015/050068
PCT Pub. Date: Apr. 9, 2015

(65) Prior Publication Data
US 2016/0243946 A1 Aug. 25, 2016

(30) Foreign Application Priority Data

Oct. 1, 2013 (JP) .................................. 2013-206480

(51) Int. Cl.
*H02P 3/14* (2006.01)
*B60L 7/22* (2006.01)
(Continued)

(52) U.S. Cl.
CPC ............... *B60L 7/22* (2013.01); *B60L 3/0069* (2013.01); *B60L 7/003* (2013.01); *B60L 7/14* (2013.01);
(Continued)

(58) Field of Classification Search
CPC ....................................................... H02P 3/12
(Continued)

(56) References Cited

U.S. PATENT DOCUMENTS 7,034,475 B2* 4/2006 Kato ........................ H02P 3/14
318/139
7,088,065 B2* 8/2006 Ishikawa ................... B60L 7/26
307/48
(Continued)

FOREIGN PATENT DOCUMENTS

JP 2002-17098 A 1/2002
JP 2008-125162 A 5/2008
(Continued)

OTHER PUBLICATIONS

International Search Report (PCT/ISA/210) issued in PCT Application No. PCT/JP2014/075774 dated Jan. 6, 2015 with English-language translation (four (4) pages).
(Continued)

*Primary Examiner* — David S Luo
(74) *Attorney, Agent, or Firm* — Crowell & Moring LLP

(57) ABSTRACT

Even in the case in which an overvoltage is generated when a vehicle is in a non-operation state, the overvoltage can be suppressed. A power conversion device is connected to a three-phase motor mounted on a vehicle and includes an inverter circuit, a gate drive substrate, and a motor control substrate. In the motor control substrate, when the vehicle is in the non-operation state and a regenerative voltage applied from the three-phase motor to the inverter circuit becomes equal to or more than a predetermined threshold value, a power supply circuit supplies operation power to a control circuit. The control circuit starts when the operation power is supplied from the power supply circuit and outputs gate control signals to a driver circuit of the gate drive substrate, such that regenerative energy according to the regenerative
(Continued)

voltage is consumed between the three-phase motor and the inverter circuit.

8 Claims, 4 Drawing Sheets

(51) Int. Cl.
  *H02P 27/06*   (2006.01)
  *H02M 7/797*   (2006.01)
  *B60L 3/00*   (2006.01)
  *B60L 7/14*   (2006.01)
  *B60L 11/18*   (2006.01)
  *B60L 15/00*   (2006.01)
  *H02P 3/12*   (2006.01)
  *B60L 7/00*   (2006.01)
  *H02P 3/22*   (2006.01)
  *H02M 1/00*   (2006.01)

(52) U.S. Cl.
  CPC ....... *B60L 11/1803* (2013.01); *B60L 11/1864* (2013.01); *B60L 15/007* (2013.01); *H02M 7/797* (2013.01); *H02P 3/12* (2013.01); *H02P 3/14* (2013.01); *H02P 27/06* (2013.01); *B60L 2240/427* (2013.01); *B60L 2240/525* (2013.01); *B60L 2240/527* (2013.01); *H02M 2001/0003* (2013.01); *H02P 3/22* (2013.01); *Y02T 10/644* (2013.01); *Y02T 10/645* (2013.01); *Y02T 10/7005* (2013.01); *Y02T 10/7061* (2013.01)

(58) Field of Classification Search
  USPC ......................................... 318/376, 375, 362
  See application file for complete search history.

(56) References Cited

U.S. PATENT DOCUMENTS

| | | | |
|---|---|---|---|
| 8,022,659 B2* | 9/2011 | Kono | ................ B60L 9/00 318/807 |
| 8,598,819 B2* | 12/2013 | Rollman | ................ H02P 29/02 318/139 |
| 2011/0310644 A1 | 12/2011 | Ogura et al. | |
| 2013/0049665 A1 | 2/2013 | Oyobe et al. | |
| 2013/0328514 A1 | 12/2013 | Funaba et al. | |

FOREIGN PATENT DOCUMENTS

| | | |
|---|---|---|
| JP | 2009-284747 A | 12/2009 |
| JP | 2011-223856 A | 11/2011 |
| JP | 2012-235591 A | 11/2012 |
| JP | 2013-46432 A | 3/2013 |
| JP | 2013-66326 A | 4/2013 |
| JP | 2013-121256 A | 6/2013 |
| WO | WO 2012/117893 A1 | 9/2012 |

OTHER PUBLICATIONS

Japanese-language Written Opinion (PCT/ISA/237) issued in PCT Application No. PCT/JP2014/075774 dated Jan. 6, 2015 (four (4) pages).
Extended European Search Report issued in counterpart European Application No. 14850880.7 dated Apr. 11, 2017 (eight (8) pages).
Japanese Office Action issued in counterpart Japanese Application No. 2015-540478 dated Jun. 6, 2017 with English translation (nine pages).

* cited by examiner

POWER CONVERSION DEVICE

TECHNICAL FIELD

The present invention relates to a power conversion device that converts direct-current power into alternating-current power.

BACKGROUND ART

A power conversion device that is mounted on an electric motor vehicle such as an electric vehicle (EV) and a hybrid electric vehicle (HEV) and is connected to a motor for drive has a power conversion function of converting direct-current power for motor drive supplied from a direct-current power supply into alternating-current power or converting alternating-current power generated from a motor into direct-current power for direct-current power supply charge. To realize the power conversion function, a switching element such as a metal-oxide-semiconductor field-effect transistor (MOSFET) and an insulated gate bipolar transistor (IGBT) is generally used in the power conversion device. If a voltage more than a predetermined withstand voltage is applied, the switching element may cause withstand voltage breakdown and may be damaged. For this reason, it is necessary to cause an application voltage to be not more than the withstand voltage.

In a normal electric motor vehicle, to use power efficiently, the direct-current power supply is charged by compulsorily rotating a motor at the time of braking or descending a slope, causing the motor to function as a generator, and generating a regenerative voltage (counter electromotive force). However, when a rotation number of the motor increases, a large regenerative voltage is generated. For this reason, the regenerative voltage is more than the withstand voltage, so that the switching element may cause the withstand voltage breakdown. Therefore, to prevent the withstand voltage breakdown, a mechanism for suppressing an overvoltage is provided in the power conversion device according to the related art.

For example, PTL 1 suggests a method of turning on a switching element according to a rotation position of a motor at the time of generating an overvoltage, under control of a CPU, connecting a plurality of phases of the motor in series, and suppressing the overvoltage, in a motor control device to control the motor.

In addition, PTL 2 describes a method of controlling a switching element of an inverter by an inverter control unit, such that a regenerative voltage input from the inverter to a direct-current power supply is detected and at least one of opening and short-circuiting between a motor drive device and a motor is performed on the basis of a detection result thereof.

CITATION LIST

Patent Literature

PTL 1: Japanese Patent Application Laid-Open No. 2002-17098
PTL 2: Japanese Patent Application Laid-Open No. 2009-284747

SUMMARY OF INVENTION

Technical Problem

In the overvoltage suppression method according to the related art described above, the switching element is controlled by the CPU or the inverter control unit when the overvoltage is generated, an output terminal of the motor is connected to a reference potential (ground terminal) of the power supply, a current is circulated between the motor and the reference potential (ground terminal), and the overvoltage is suppressed. However, the CPU or the inverter control unit executing such control starts an operation, when a key switch of a vehicle is turned on and power is supplied. For this reason, when the key switch of the vehicle is turned off and the vehicle is in a non-operation state, in the case in which the vehicle is pulled, the motor is compulsorily rotated, and the overvoltage is generated, the switching element cannot be controlled. As a result, there is a problem in that the overvoltage cannot be suppressed.

Solution to Problem

A power conversion device according to the present invention is connected to a motor mounted on a vehicle. The power conversion device includes an inverter circuit which has a plurality of power conversion elements and converts direct-current power from a direct-current power supply into alternating-current power to drive the motor, using the plurality of power conversion elements; a gate drive substrate which has a driver circuit to output drive signals to operate the plurality of power conversion elements; and a motor control substrate which has a first control circuit to output control signals to output the drive signals to the driver circuit and a power supply circuit to supply operation power to the first control circuit. When the vehicle is in a non-operation state and a regenerative voltage applied from the motor to the inverter circuit becomes equal to or more than a predetermined first threshold value, the power supply circuit supplies the operation power to the first control circuit. The first control circuit starts when the operation power is supplied from the power supply circuit and outputs the control signals to the driver circuit, such that regenerative energy according to the regenerative voltage is consumed between the motor and the inverter circuit.

Advantageous Effects of Invention

According to the present invention, even in the case in which an overvoltage is generated when a vehicle is in a non-operation state, the overvoltage can be suppressed.

DESCRIPTION OF EMBODIMENTS

Description of Related Art

Before describing the present invention, first, the related art will be described hereinafter.

Figure 1:
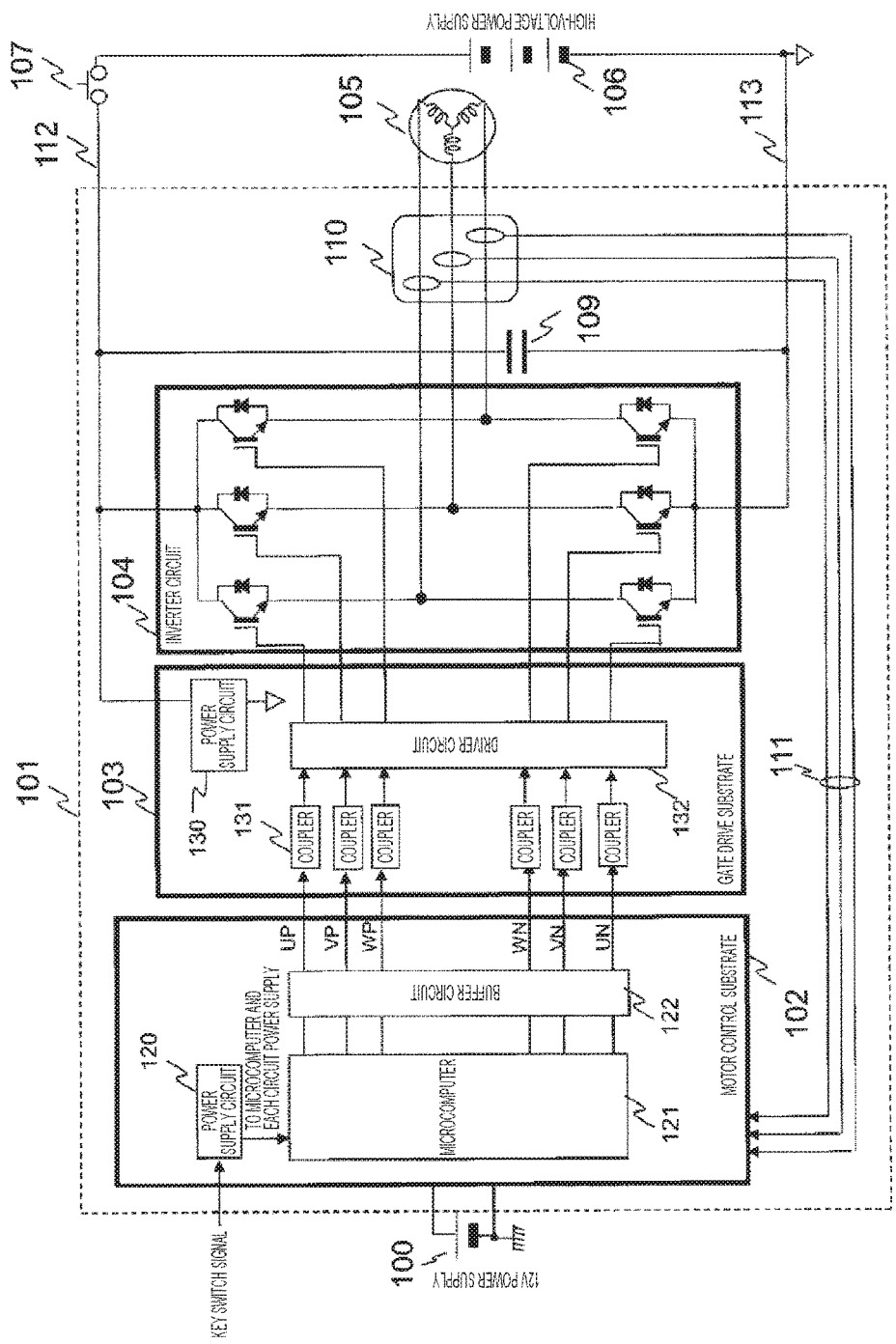
FIG. 1 is a block diagram illustrating an example of an electric circuit configuration of a power conversion device for three-phase motor drive in the related art.

FIG. 1 is a block diagram illustrating an example of an electric circuit configuration of a power conversion device 101 for three-phase motor drive in the related art. The power conversion device 101 illustrated in FIG. 1 mainly includes a motor control substrate 102, a gate drive substrate 103, an inverter circuit 104 having a plurality of IGBTs to be power conversion elements, a smoothing capacitor 109, and a current sensor 110. The inverter circuit 104 is connected to a high-voltage power supply 106 for motor drive to be a direct-current power supply by a positive electrode wiring line 112 and a negative electrode wiring line 113. Here, the positive electrode wiring line 112 is connected to a positive electrode side (high voltage side) of the high-voltage power supply 106 via a contactor 107 and the negative electrode wiring line 113 is connected to a negative electrode side (low voltage side) of the high-voltage power supply 106. In addition, the power conversion device 101 is connected to a three-phase motor 105 mounted on a vehicle.

In the inverter circuit 104, N-type IGBTs operating as switching elements are connected (totem-pole connection) in series in two steps between the positive electrode wiring line 112 and the negative electrode wiring line 113. Of the two IGBTs, the IGBT connected to the side of the positive electrode wiring line 112, that is, the high voltage side of the high-voltage power supply 106 is called an upper arm and the IGBT connected to the side of the negative electrode wiring line 113, that is, the low voltage side of the high-voltage power supply 106 is called a lower arm. The power conversion device 101 needs outputs corresponding to a total of three phases of a U phase, a V phase, and a W phase to drive the three-phase motor 105. For this reason, three series circuits in which the upper and lower arms are connected in series are embedded in the inverter circuit 104 and the series circuits corresponding to the individual phases are connected in parallel with respect to the high-voltage power supply 106. In the series circuit of each phase, a common terminal connecting an emitter of the upper arm and a collector of the lower arm is connected to the three-phase motor 105 via an output terminal of the power conversion device 101.

A circulation diode (FWD) is connected between a collector and an emitter of each IGBT of the inverter circuit 104. A cathode of the circulation diode is connected to a collector side of the IGBT and an anode of the circulation diode is connected to an emitter side of the IGBT.

The smoothing capacitor 109 suppresses a variation of a direct-current voltage generated by a switching operation executed by each IGBT of the inverter circuit 104 and is connected in parallel to the inverter circuit 104 between the positive electrode wiring line 112 and the negative electrode wiring line 113. That is, the series circuit of the upper and lower arms of the inverter circuit 104 is connected in parallel to the smoothing capacitor 109 with respect to the high-voltage power supply 106.

The gate drive substrate 103 has a power supply circuit 130, couplers 131, and a driver circuit 132.

The power supply circuit 130 generates predetermined operation power using direct-current power supplied from the high-voltage power supply 106 and supplies the operation power to each portion in the gate or substrate 103. The driver circuit 132 operates using the operation power supplied from the power supply circuit 130.

Gate control signals UP, VP, WP, UN, VN, and UN corresponding to the upper and lower arms of the individual phases are input from the motor control substrate 102 to the driver circuit 132 via the couplers 131 provided to correspond to the individual gate control signals. The driver circuit 132 generates drive signals to operate the individual IGBTs of the inverter circuit 104, on the basis of the input individual gate control signals UP, VP, WP, UN, VN, and UN, and outputs the drive signals to the inverter circuit 104.

The motor control substrate 102 has a power supply circuit. 120, a microcomputer 121, and a buffer circuit 122.

If a key switch of the vehicle is turned, on, a key switch signal is input to the power supply circuit 120. If the key switch signal is input, the power supply circuit 120 generates predetermined operation power using direct-current power supplied from a 12V power supply 100 for the vehicle and supplies the operation power to each portion in the motor control substrate 102. The microcomputer 121 and the buffer circuit 122 operate using the operation power supplied from the power supply circuit 120.

The microcomputer 121 is connected to an upper control device (not illustrated in the drawings) and an operating command to command an operating state of the three-phase motor 105 is input from the control device to the microcomputer 121. In addition, the magnitude of a current flowing to the three-phase motor 105, detected by the current sensor 110, is input as a current sense signal 111 to the microcomputer 121. In an actual form, other signal such as a resolver sense signal and a monitor value of a voltage between P and N is also input to the microcomputer 121. The microcomputer 121 outputs the gate control signals UP, VP, WP, UN, VN, and WN to the driver circuit 132 of the gate drive substrate 103 via the buffer circuit 122, on the basis of the operating command and the current sense signal 111 input described above. Each of the gate control signals is negative logic. When the corresponding IGBT is turned off, a signal of an 'H' level is output from the microcomputer 121 and when the corresponding IGBT is turned on, a signal of an 'L' level is output from the microcomputer 121.

Here, there is an important point to be noted. This is that a reference potential of the motor control substrate 102 and a reference potential of the driver circuit 132 in the gate drive substrate 103 are different from each other. Specifically, because the 12V power supply 100 supplying power to the motor control substrate 102 is a power supply for the vehicle, the reference potential thereof is connected to a body of the vehicle on which the power conversion device 101 is mounted. As a result, the reference potential of the motor control substrate 102 becomes a potential of the body of the vehicle. Meanwhile, the reference potential of the driver circuit 132 is the same potential as an emitter voltage of the corresponding IGBT, that is, the output terminal of the power conversion device 101 connected to the three-phase motor 105, with respect to the upper arm side, and becomes a negative electrode potential of the high-voltage power supply 106, with respect to the lower arm side. These reference potentials are different from the reference potential of the motor control substrate 102, that is, the potential of the body of the vehicle. For this reason, the gate control signals UP, VP, WP, UN, VN, and WN input from the microcomputer 121 to the gate drive substrate 103 are input to the driver circuit 132 via the couplers 131.

Next, an outline of an operation of the power conversion device 101 will be described with reference to FIG. 1. The power conversion device 101 transmits the gate control signals UP, VP, WP, UN, VN, and WN of a PWM system from the microcomputer 121 of the motor control substrate 102 to the driver circuit. 132 of the gate drive substrate 103, to switch the individual IGBTs of the inverter circuit 104. Here, because the reference potentials are different in the motor control substrate 102 and the gate drive substrate 103 as described above, the gate control signals are transmitted from the microcomputer 121 to the driver circuit 132 via the couplers 131 to be insulating signal transmission devices. The driver circuit 132 applies a voltage between a gate terminal and an emitter terminal of the corresponding IGBT, on the basis of the input gate control signal, and switches the IGBT. In this way, each IGBT of the inverter circuit 104 is switched at predetermined timing, the direct-current power supplied from the high-voltage power supply 106 is converted into alternating-current power, a current flows to the three-phase motor 105 via each IGBT, and the three-phase motor 105 is driven. At this time, the current flowing to the three-phase motor 105 is observed by the current sensor 110 and as the current sense signal 111, the current is fed back to the microcomputer 121 of the motor control substrate 102. As a result, the microcomputer 121 controls the current flowing to the three-phase motor 105 and controls drive of the three-phase motor 105.

The power conversion device 101 for the three-phase motor drive in the related art has the configuration described above.

DESCRIPTION OF PRESENT INVENTION

Next, a power conversion device according to an embodiment of the present invention will be described hereinafter using FIGS. 2 to 4.

Figure 2:
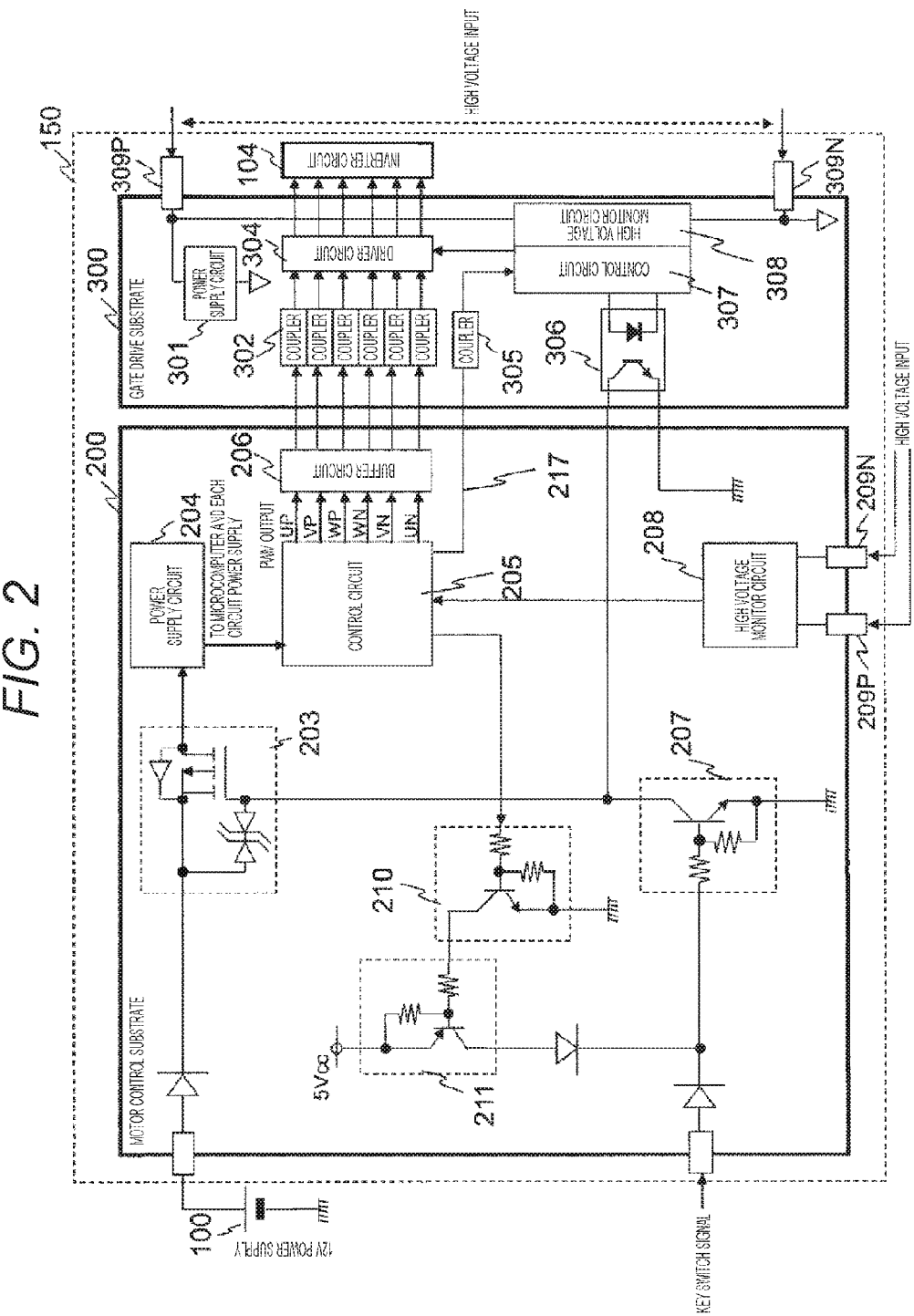
FIG. 2 is a block diagram illustrating an example of an electric circuit configuration of a power conversion device according to an embodiment of the present invention.

FIG. 2 is a block diagram illustrating an example of an electric circuit configuration of a power conversion device 150 according to the embodiment of the present invention. In FIG. 2, configurations common to the power conversion device 101 according to the related art illustrated in FIG. 1 are denoted with the same reference numerals and illustration of a three-phase motor 105, a current sensor 110, and a current sense signal 111 is omitted. In addition, illustration of individual IGBTs of upper and lower arms of an inverter circuit 104, a high-voltage power supply 106, and a smoothing capacitor 109 is omitted.

The power conversion device 150 illustrated in FIG. 2 includes a motor control substrate 200 and a gate drive substrate 300, instead of the motor control substrate 102 and the gate drive substrate 103 included in the power conversion device 101 according to the related art illustrated in FIG. 1.

The motor control substrate 200 has a power supply circuit 204, a control circuit 205, a buffer circuit 206, and a high voltage monitor circuit 208. The control circuit 205 has the same gate control signal output function as the microcomputer 121 in the power conversion device 101 according to the related art illustrated in FIG. 1 and is configured using a microcomputer, for example. A high voltage applied to the inverter circuit 104 is input to the high voltage monitor circuit 208 via high voltage terminals 209P and 209N.

The gate drive substrate 300 has a power supply circuit 301, a driver circuit 304, a photo coupler 306, a control circuit 307, and a high voltage monitor circuit 308. The control circuit 307 is configured using a microcomputer, for example. The driver circuit 304 has the same start signal output function as the driver circuit 132 in the power conversion device 101 according to the related art illustrated in FIG. 1. The high voltage applied to the inverter circuit 104 is input to the high voltage monitor circuit 308 via high voltage terminals 309P and 309N. The power supply circuit 301 generates operation power used in the gate drive substrate 300, using the high voltage input to the high voltage terminal 309P.

When a key switch of a vehicle is turned on and the vehicle is in an operation state, a key switch signal is input to the motor control substrate 200, a collector and an emitter of a transistor 207 are electrically connected to each other, and the transistor 207 is turned on. If the transistor 207 is turned on, a drain and a source of a MOSFET 203 are electrically connected to each other and the MOSFET 203 is turned on.

If the MOSFET 203 is turned on, direct-current power is supplied from a 12V power supply 100 for the vehicle to the power supply circuit 204 via the MOSFET 203 and the power supply circuit 204 starts and starts an operation. The power supply circuit 204 generates operation power of the control circuit 205 using the direct-current power and supplies the operation power to the control circuit 205.

If the operation power is supplied from the power supply circuit 204, the control circuit 205 starts and starts an operation. Similar to the microcomputer 121 in the power conversion device 101 according to the related art illustrated in FIG. 1, the control circuit 205 is connected to an upper control device (not illustrated in the drawings). When the vehicle is in the operation state, an operating command to command an operating state of a three-phase motor 105 is input from the control device to the control circuit 205. The control circuit 205 outputs gate control signals UP, VP, WP, UN, VN, and WN of the same PWM system as FIG. 1 to the gate drive substrate 300 via the buffer circuit 206, on the basis of the input operating command.

The individual gate control signals UP, VP, WP, UN, VN, and WN input to the gate drive substrate 300 are input to the driver circuit 304 via couplers 302 provided to correspond to the individual gate control signals. The driver circuit 304 generates drive signals to operate individual IGBTs of the inverter circuit 104, on the basis of the input gate control signals UP, VP, WP, UN, VN, and WN, and outputs the drive signals to the inverter circuit 104.

Meanwhile, when the vehicle is in a non-operation state, the key switch signal is not input to the motor control substrate 200, because the key switch of the vehicle is turned off. At this time, if the vehicle is pulled and the three-phase motor 105 is compulsorily rotated, the three-phase motor 105 functions as a generator and a regenerative voltage (counter electromotive force) is generated in the three-phase motor 105. The regenerative voltage generated by the three-phase motor 105 is applied to the inverter circuit 104.

The regenerative voltage applied from the three-phase motor 105 to the inverter circuit 104 is input to the high voltage monitor circuit 308 via the high voltage terminals 309P and 309N. If the regenerative voltage becomes equal to or more than a predetermined voltage, for example, 50V, the power supply circuit 301 starts and starts to supply the operation power used in the gate drive substrate 300. As a result, the gate drive substrate 300 automatically starts.

If the gate drive substrate 300 starts and the operation power is supplied from the power supply circuit 301, the high voltage monitor circuit 308 detects the regenerative voltage input from the three-phase motor 105 via the high voltage terminals 309P and 309N. A detection result of the regenerative voltage is output from the high voltage monitor circuit 308 to the control circuit 307.

If the regenerative voltage detected by the high voltage monitor circuit 308 becomes equal to or more than a predetermined threshold value, for example, 60V, the control circuit 307 turns on the transistor of the photo coupler 306, so that a start signal is output to the motor control substrate 200 via the photo coupler 306. The start signal is a signal to operate the power supply circuit 204 in the motor control substrate 200 and start the control circuit 205. The control circuit 307 outputs the start signal to the motor control substrate 200 for a predetermined time at least longer than a start time of the control circuit 205, for example, five seconds.

If the transistor of the photo coupler 306 is turned on and the start signal is input to the motor control substrate 200, similar to the case in which the transistor 207 is turned on, the drain and the source of the MOSFET 203 are electrically connected to each other and the MOSFET 203 is turned on in this case, the direct-current power is supplied from the 12V power supply 100 for the vehicle to the power supply circuit. 204 via the MOSFET 203 and the power supply circuit 204 starts and starts the operation. As a result, the motor control substrate 200 starts, the operation power is supplied from the power supply circuit 204 to the control circuit 205, and the control circuit 205 and the high voltage monitor circuit 208 start the operation.

If the motor control substrate 200 starts and the operation power is supplied from the power supply circuit 204, the high voltage monitor circuit 208 detects the regenerative voltage input from the three-phase motor 105 via the high voltage terminals 209P and 209N. A detection result of the regenerative voltage is output from the high voltage monitor circuit 208 to the control circuit 205.

Here, when the vehicle is in a non-operation state, an operating command is not input from the upper control device to the control circuit 205. Therefore, in this case, the control circuit 205 outputs the gate control signals UP, VP, WP, UN, VN, and WN based on predetermined signal patterns to the gate drive substrate 300 via the buffer circuit 206, such that regenerative energy according to the regenerative voltage is consumed between the three-phase motor 105 and the inverter circuit 104, after the start. For example, the individual gate control signals are output such that three-phase short to turn on all the IGBTs of one of the IGBTs of the upper arms and the IGBTs of the lower arms of the inverter circuit 104 and turn off all the IGBTs of the other and six-phase open to turn off all the IGBTs of the upper and lower arms are alternately repeated. The detection result of the regenerative voltage by the high voltage monitor circuit 208 or a temperature of the inverter circuit 104 may be monitored and each gate control signal may be output on the basis of a monitor result thereof. The driver circuit 304 operates each IGBT of the inverter circuit 104 according to each gate control signal, so that each IGBT can be protected even though the regenerative voltage of the high voltage is applied from the three-phase motor 105 to the inverter circuit 104.

After the operation power is supplied from the power supply circuit 204 to the control circuit 205 and the control circuit 205 starts, the control circuit 205 outputs an operation continuation signal to continuously execute the operation of the power supply circuit 204 to a transistor 210. If the operation continuation signal is input from the control circuit 205, the transistor 210 is turned on. If the transistor 210 is turned on, a transistor 211 is turned on. If the transistor 211 is turned on, an operation power supply voltage of 5V generated by the power supply circuit 204 is input to a base of the transistor 207 and the transistor 207 is turned on. As a result, the MOSFET 203 is maintained in an ON state and the operation of the power supply circuit 204 can be continuously executed. Therefore, even though the start signal is not input from the control circuit 307 of the gate drive substrate 300, the motor control substrate 200 can be maintained in an operation state.

In addition, the control circuit 205 outputs an operation state signal regarding an operation state of the control circuit. 205 to the gate drive substrate 300 via a signal line 217. For example, if the operation state of the control circuit 205 is normal, a signal of an 'H' level is output as an operation state signal from the control circuit 205 and if the operation state is abnormal, a signal of an 'L' level is output as the operation state signal.

The operation state signal input from the control circuit. 205 is input to the control circuit 307 via a coupler 305 in the gate drive substrate 300. The control circuit 307 determines whether the operation state of the motor control substrate 200 (control circuit 205) is normal, on the basis of the input operation state signal. As a result, when it is determined that the operation state of the motor control substrate 200 (control circuit 205) is abnormal, the control circuit 307 controls a drive signal output from the driver circuit 304 to the inverter circuit 104, instead of the control circuit 205. For example, the gate control signals are output to the driver circuit 304, such that the three-phase short and the six-phase open are alternately repeated. As a result, the drive signal output from the driver circuit 304 is controlled such that regenerative energy according to the regenerative voltage is consumed between the three-phase motor 105 and the inverter circuit 104 and the operation of each IGBT of the inverter circuit 104 is controlled.

The control circuit 205 executes the operation described above, when the regenerative voltage detected by the high voltage monitor circuit 208 is equal to or more than a predetermined threshold value, for example, 20V. When the regenerative voltage is less than the threshold value, the control circuit 205 stops the operation thereof after executing a predetermined end process, stops an output of the gate control signal and the operation state signal to the gate drive substrate 300, and stops an output of the operation continuation signal.

If the output of the operation continuation signal from the control circuit 205 is stopped, the transistors 210 and 211 are turned off, so that the supply of the operation power from the power supply circuit 204 is stopped. As a result, if pulling of the vehicle ends and the compulsive rotation of the three-phase motor 105 is not performed, consumption of the 12V power supply 100 can be suppressed by stopping the operation of the motor control substrate 200 immediately.

As described above, the threshold voltage in which the control circuit 205 stops the operation is preferably set to a value lower than the threshold voltage in which the control circuit 307 outputs the start signal. In this way, the operation state of the motor control substrate 200 can be appropriately switched according to the regenerative voltage generated by the three-phase motor 105.

Figure 3:
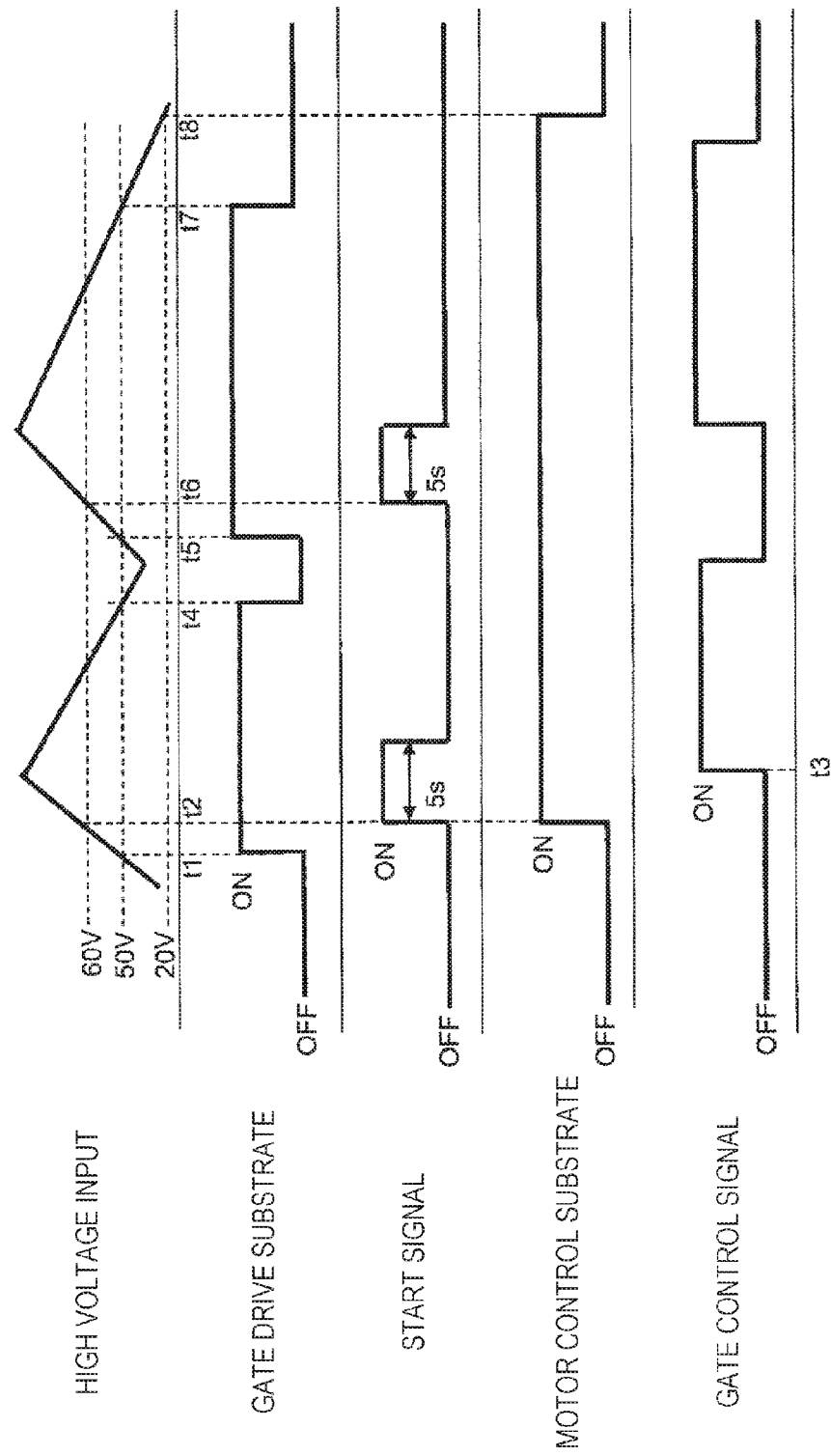
FIG. 3 is a timing chart illustrating an operation timing example of each portion in the power conversion device according to the embodiment of the present invention.

FIG. 3 is a timing chart illustrating an operation timing example of each portion in the power conversion device 150 according to the embodiment of the present invention.

At a time t1, if a high voltage input to the high voltage monitor circuit 308 becomes equal to or more than 50V by the regenerative voltage generated by the three-phase motor 105, the supply of the operation power from the power supply circuit 301 starts and the gate drive substrate 300 starts. Then, at a time t2, if the high voltage input to the high voltage monitor circuit 308 becomes equal to or more than 60V, the start signal is output from the control circuit 307 to the motor control substrate 200. According to the output of the start signal, the supply of the operation power from the power supply circuit 204 starts and the motor control substrate 200 starts.

If the motor control substrate 200 starts, at a time t3, the gate control signals UP, VP, WP, UN, VN, and WN to consume the regenerative energy are output from the control circuit 205 to the gate drive substrate 300. Thereby, each IGBT of the inverter circuit 104 is operated, the three-phase short or the six-phase open is repeated, the voltage or the temperature is suppressed from increasing, and components are protected.

At a time t4, if the high voltage input to the high voltage monitor circuit 308 becomes less than 50V, the operation of the gate drive substrate 300 is stopped. However, the operation of the motor control substrate 200 is continuously executed. Then, at a time t5, if the high voltage input to the high voltage monitor circuit 308 becomes equal to or more than 50V, the gate drive substrate 300 starts again. At a time t6, if the high voltage input to the high voltage monitor circuit 308 becomes equal to or more than 60V, the start signal is output from the control circuit 307 to the motor control substrate 200. In this case, because the motor control substrate 200 already starts, the operation of the motor control substrate 200 is continuously executed.

At a time t7, if the high voltage input to the high voltage monitor circuit 308 becomes less than 50V, the operation of the gate drive substrate 300 is stopped. Then, at a time t8, if the high voltage input to the high voltage monitor circuit 308 becomes less than 20V, the output of the operation continuation signal from the control circuit 205 is stopped and the operation of the motor control substrate 200 is stopped. As a result, the 12V power supply 100 can be suppressed from being consumed or deteriorated.

Figure 4:
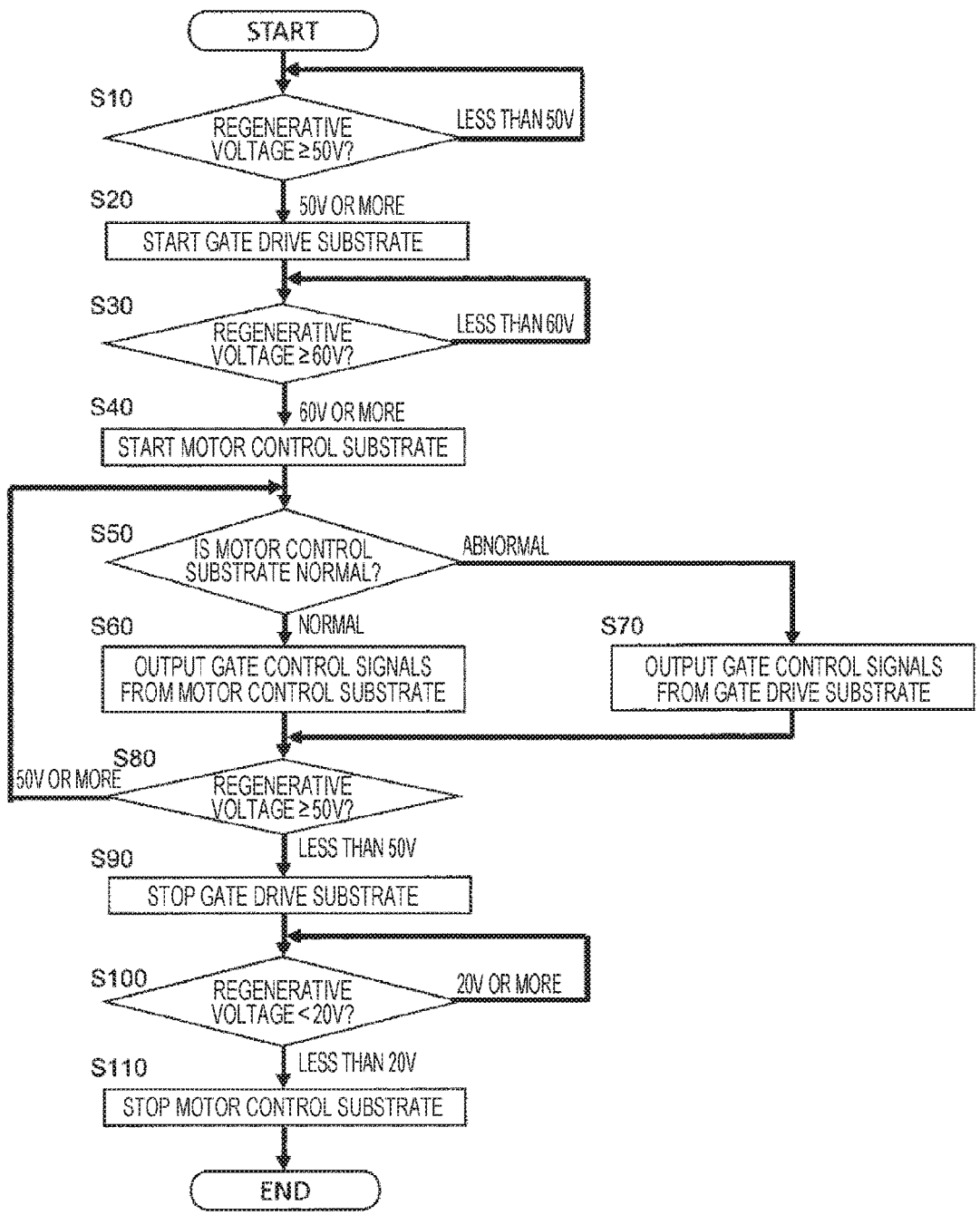
FIG. 4 is a flowchart illustrating a sequence of a process in the power conversion device according to the embodiment of the present invention.

FIG. 4 is a flowchart illustrating a sequence of a process in the power conversion device 150 according to the embodiment of the present invention.

In step S10, it is determined by the power supply circuit 301 whether the regenerative voltage from the three-phase motor 105 is equal to or more than 50V. If the vehicle is pulled in a state in which the key switch is turned off, the regenerative energy generated by the three-phase motor 105 increases, and the regenerative voltage applied to the inverter circuit 104 becomes equal to or more than 50V, the process proceeds to step S20.

In step S20, the supply of the operation power from the power supply circuit 301 starts and the gate drive substrate 300 starts.

In step S30, it is determined by the control circuit 307 whether the regenerative voltage from the three-phase motor 105 is equal to or more than 60V. When the input high voltage detected by the high voltage monitor circuit 308 is equal to or more than 60V, the control circuit 307 determines that the regenerative voltage is equal to or more than 60V and the process proceeds to step S40.

In step S40, the start signal is output from the control circuit 307 to the motor control substrate 200, the supply of the operation power from the power supply circuit 204 starts, and the motor control substrate 200 starts.

In step S50, it is determined by the control circuit 307 whether the operation state of the motor control substrate 200 is normal, on the basis of the operation state signal output from the control circuit 205. As a result, when it is determined that the operation state is normal, the process proceeds to step S60 and when the operation state is abnormal, the process proceeds to step S70.

In step S60, the gate control signals based on the predetermined signal patterns are output from the control circuit 205 to the driver circuit 304, so that the gate control signals are output from the motor control substrate 200. Thereby, the control is executed to output the drive signals repeating the three-phase short and the six-phase open from the driver circuit 304, such that the regenerative energy is consumed between the three-phase motor 105 and the inverter circuit 104, and the operation of each IGBT of the inverter circuit 104 is controlled. If step S60 is executed, the process proceeds to step S80.

In step S70, the gate control signals based on the predetermined signal patterns are output from the control circuit 307 to the driver circuit 304, so that the gate control signals are output from the gate drive substrate 300. Thereby, the control is executed to output the drive signals repeating the three-phase short and the six-phase open from the driver circuit 304, such that the regenerative energy is consumed between the three-phase motor 105 and the inverter circuit 104, and the operation of each IGBT of the inverter circuit 104 is controlled. If step S70 is executed, the process proceeds to step S80.

In step S80, it is determined by the power supply circuit 301 whether the regenerative voltage from the three-phase motor 105 is equal to or more than 50V. The process returns to step S50 when the regenerative voltage applied from the three-phase motor 105 to the inverter circuit 104 is maintained at 50V or more. If the regenerative voltage becomes less than 50V, the process proceeds to step S90.

In step S90, the supply of the operation power from the power supply circuit 301 is stopped, so that the operation of the gate drive substrate 300 is stopped.

In step S100, it is determined by the control circuit 205 whether the regenerative voltage from the three-phase motor 105 is less than 20V. When the input high voltage detected by the high voltage monitor circuit 208 is less than 20V, the control circuit 205 determines that the regenerative voltage is less than 20V and the process proceeds to step S110.

In step S110, the output of the operation continuation signal from the control circuit 205 is stopped, the supply of the operation power from the power supply circuit 204 is stopped, and the operation of the motor control substrate 200 is stopped. If a process of step S110 is executed, the flowchart of FIG. 4 ends.

According to the embodiment described above, the following functions and effects can be achieved.

(1) A power conversion device 150 is connected to a three-phase motor 105 mounted on a vehicle and includes an inverter circuit 104, a gate drive substrate 300, and a motor control substrate 200. The inverter circuit. 104 has a plurality of IGBTs to be power conversion elements and converts direct-current power from a high-voltage power supply 106 to be a direct-current power supply into alternating-current power to drive the three-phase motor 105, using the plurality of IGBTs. The gate drive substrate 300 has a driver circuit 304 to output drive signals to operate the plurality of IGBTs. The motor control substrate 200 has a control circuit 205 to output gate control signals to output the drive signals to the driver circuit 304 and a power supply circuit 204 to supply operation power to the control circuit 205. In the power conversion device 150, when the vehicle is in a non-operation state and a regenerative voltage applied from the three-phase motor 105 to the inverter circuit 104 becomes equal to or more than a predetermined threshold value, the power supply circuit 204 supplies the operation power to the control circuit 205. In addition, the control circuit 205 starts when the operation power is supplied from the power supply circuit 204 and outputs the gate control signals to the driver circuit 304, such that regenerative energy according to the regenerative voltage is consumed between the three-phase motor 105 and the inverter circuit 104. In this way, even in the case in which an overvoltage is generated when the vehicle in the non-operation state, the overvoltage can be suppressed.

(2) The gate drive substrate 300 further has a high voltage monitor circuit 308 which detects the regenerative voltage and a control circuit 307 which, when the regenerative voltage detected by the high voltage monitor circuit 308 becomes equal to or more than the predetermined threshold value, outputs a start signal to operate the power supply circuit 204 and start the control circuit 205 to the motor control substrate 200. In this way, when the regenerative voltage becomes the overvoltage, the gate control signals can be surely output from the control circuit 205 to the driver circuit 304.

(3) The control circuit 307 outputs the start signal for predetermined time at least longer than a start time of the control circuit 205. As a result, the control circuit 205 can be surely started by the start signal from the control circuit 307.

(4) After the operation power is supplied from the power supply circuit 204 to the control circuit 205 and the control circuit 205 starts, the control circuit 205 outputs an operation continuation signal to continuously execute an operation of the power supply circuit 204. As a result, even when the regenerative voltage decreases after the control circuit 205 starts, an operation state of the control circuit 205 can be maintained.

(5) When the regenerative voltage becomes less than a predetermined threshold value smaller than the threshold value, the control circuit 205 stops an output of the operation continuation signal. In this way, if pulling of the vehicle ends and a repulsive rotation of the three-phase motor 105 is not performed, an operation of the motor control substrate 200 is stopped immediately, so that a 12V power supply 100 can be suppressed from being consumed.

(6) The plurality of IGBTs of the inverter circuit 104 are either IGBTs of upper arms connected to a high voltage side of the high-voltage power supply 106 or IGBTs of lower arms connected to a low voltage side of the high-voltage power supply 106 and a plurality of series circuits in which the IGBTs of the upper arms and the IGBTs of the lower arms are connected in series are connected to the high-voltage power supply 106. The control circuit 205 turns on all the IGBTs of one of the IGBTs of the upper arms and the IGBTs of the lower arms and turns off all the IGBTs of the other and outputs the gate control signals, such that the regenerative energy according to the regenerative voltage is consumed between the three-phase motor 105 and the inverter circuit 104. In this way, the drive signals output from the driver circuit 304 are controlled such that the regenerative energy according the regenerative voltage is consumed between the three-phase motor 105 and the inverter circuit 104 and an operation of each IGBT of the inverter circuit 104 can be controlled.

(7) The control circuit 205 outputs an operation state signal regarding an operation state of the control circuit 205 to the gate drive substrate 300. In this way, the operation state of the control circuit 205 can be determined in the gate drive substrate 300.

(8) The control circuit 205 outputs an operation state signal regarding an operation state of the control circuit 205 to the gate drive substrate 300. The control circuit 307 determines the operation state of the control circuit 205, on the basis of the operation state signal, and outputs the gate control signals to the driver circuit 304, instead of the control circuit 205, such that the regenerative energy according to the regenerative voltage is consumed between the three-phase motor 105 and the inverter circuit 104, when it is determined that the operation state of the control circuit 205 is abnormal. In this way, even in the case in which the operation state of the control circuit 205 is abnormal, when the vehicle is in the non-operation state and the overvoltage is generated, the overvoltage can be suppressed.

In the embodiment described above, the example of using the IGBT as the power conversion element has been described. However, other power conversion element may be used. For example, the present invention can be applied to a power conversion device in which an MOSFET is used as the power conversion element.

In addition, in the embodiment described above, the power conversion device mounted on the vehicle has been described as the example. However, an application range of the present invention is not limited thereto and the present invention can be applied to power conversion devices for various uses. The above description is only exemplary and the present invention is not limited to the configuration of the embodiment.

REFERENCE SIGNS LIST

100 12V power supply
104 inverter circuit
105 three-phase motor
106 high-voltage power supply
150 power conversion device
200 motor control substrate
204 power supply circuit
205 control circuit
206 buffer circuit
208 high voltage monitor circuit
300 gate drive substrate
301 power supply circuit
304 driver circuit
307 control circuit
308 high voltage monitor circuit

The invention claimed is:

1. A power conversion device connected to a motor mounted on a vehicle, comprising:
   an inverter circuit which has a plurality of power conversion elements and converts direct-current power from a direct-current power supply into alternating-current power to drive the motor, using the plurality of power conversion elements;
   a gate drive substrate which includes a driver circuit to output drive signals to operate the plurality of power conversion elements; and
   a motor control substrate which includes a first control circuit to output control signals to output the drive signals to the driver circuit and a power supply circuit to supply operation power to the first control circuit, wherein
   when the vehicle is in a non-operation state and a regenerative voltage applied from the motor to the inverter circuit becomes equal to or more than a predetermined first threshold value, the power supply circuit supplies the operation power to the first control circuit, and
   the first control circuit starts when the operation power is supplied from the power supply circuit and outputs the control signals to the driver circuit, such that regenerative energy according to the regenerative voltage is consumed between the motor and the inverter circuit.

2. The power conversion device according to claim 1, wherein
   the gate drive substrate further includes:
   a voltage detection circuit which detects the regenerative voltage; and
   a second control circuit which, when the regenerative voltage detected by the voltage detection circuit becomes equal to or more than the first threshold value, outputs a start signal to operate the power supply circuit and start the first control circuit to the motor control substrate.

3. The power conversion device according to claim 2, wherein
the second control circuit outputs the start signal for a predetermined time at least longer than a start time of the first control circuit.

4. The power conversion device according to claim 2, wherein
the first control circuit outputs an operation state signal regarding an operation state of the first control circuit to the gate drive substrate, and
the second control circuit determines the operation state of the first control circuit, on the basis of the operation state signal, and outputs the control signals to the driver circuit, instead of the first control circuit, such that the regenerative energy according to the regenerative voltage is consumed between the motor and the inverter circuit, when it is determined that the operation state of the first control circuit is abnormal.

5. The power conversion device according to claim 1, wherein
after the operation power is supplied from the power supply circuit to the first control circuit and the first control circuit starts, the first control circuit outputs an operation continuation signal to continuously execute an operation of the power supply circuit.

6. The power conversion device according to claim 5, wherein
when the regenerative voltage becomes less than a predetermined second threshold value smaller than the first threshold value, the first control circuit stops an output of the operation continuation signal.

7. The power conversion device according to claim 1, wherein
the plurality of power conversion elements are either power conversion elements of upper arms connected to a high voltage side of the direct-current power supply or power conversion elements of lower arms connected to a low voltage side of the direct-current power supply and a plurality of series circuits in which the power conversion elements of the upper arms and the power conversion elements of the lower arms are connected in series are connected to the direct-current power supply, and
the first control circuit turns on all the power conversion elements of one of the power conversion elements of the upper arms and the power conversion elements of the lower arms and turns off all the power conversion elements of the other and outputs the control signals, such that the regenerative energy according to the regenerative voltage is consumed between the motor and the inverter circuit.

8. The power conversion device according to claim 1, wherein
the first control circuit outputs an operation state signal regarding an operation state of the first control circuit to the gate drive substrate.

* * * * *